Feb. 14, 1928.

W. G. COLES 1,659,242

TERMINAL CHECK VALVE

Filed March 28, 1927

Inventor
Wilfred G Coles
By Dodge and Sons
Attorneys

Patented Feb. 14, 1928.

1,659,242

UNITED STATES PATENT OFFICE.

WILFRED G. COLES, OF MADISON, WISCONSIN, ASSIGNOR TO MADISON-KIPP CORPORATION, OF MADISON, WISCONSIN, A CORPORATION OF WISCONSIN.

TERMINAL CHECK VALVE.

Application filed March 28, 1927. Serial No. 179,030.

This invention relates to lubrication, and particularly to force feed lubrication of steam power plants, and especially steam locomotives.

The object of the invention is to produce an improved terminal check valve, a terminal check valve being a valve interposed between the force feed lubricator and the steam engine and designed to prevent the back flow of steam from the engine to the lubricator, while permitting the flow of oil from the lubricator to the engine.

Prior to my invention it has been proposed to make use of a diaphragm actuated valve, the diaphragm being mechanically loaded in a valve closing direction and being subjected to pressure of oil in a valve opening direction so that the valve opened when the pressure on the oil exceeded a chosen value which was as great as or greater than the maximum steam pressure encountered in the engine. It has also been proposed, prior to my invention, to dispense with the mechanical loading spring and to subject the diaphragm structure to fluid pressure, and more specifically, boiler pressure acting in a valve closing direction.

My invention relates to certain improvements in terminal check valves of the classes just described, the improvements being particularly applicable to the second class mentioned.

Figure 1:
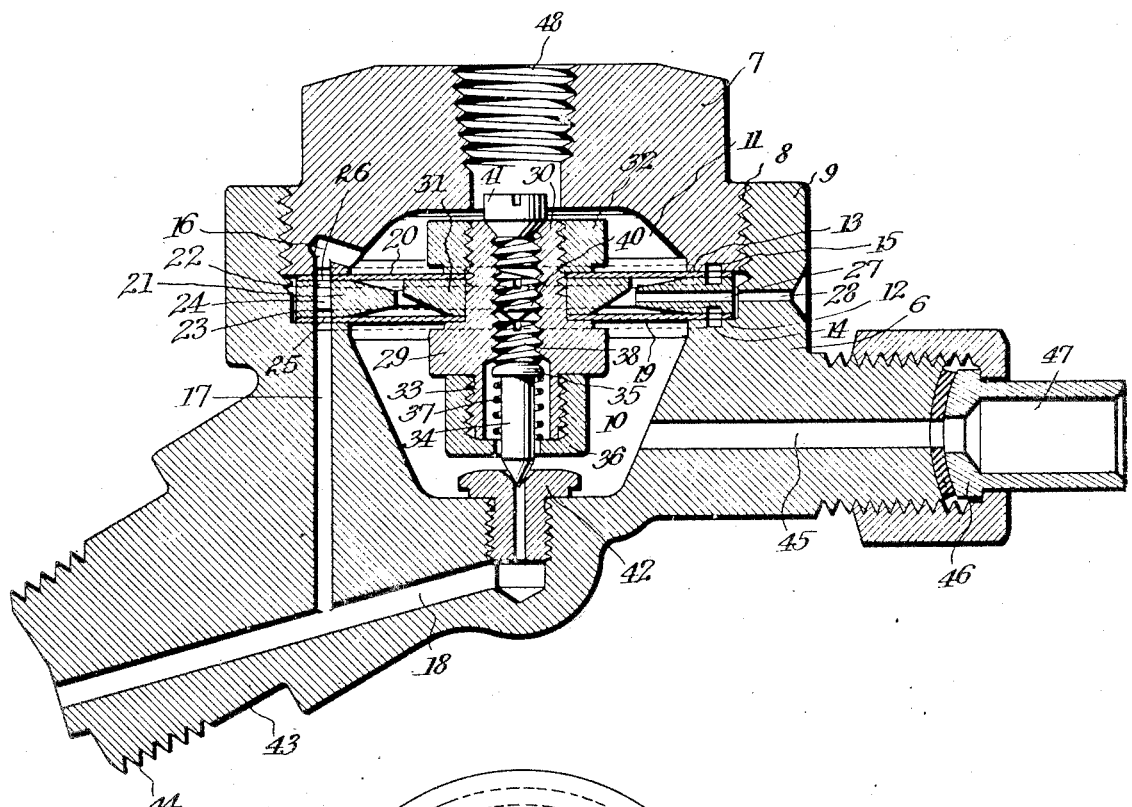

In the accompanying drawings, which illustrate the preferred embodiment of the invention, Fig. 1 is a vertical axial section of the complete check valve.

Figure 2:
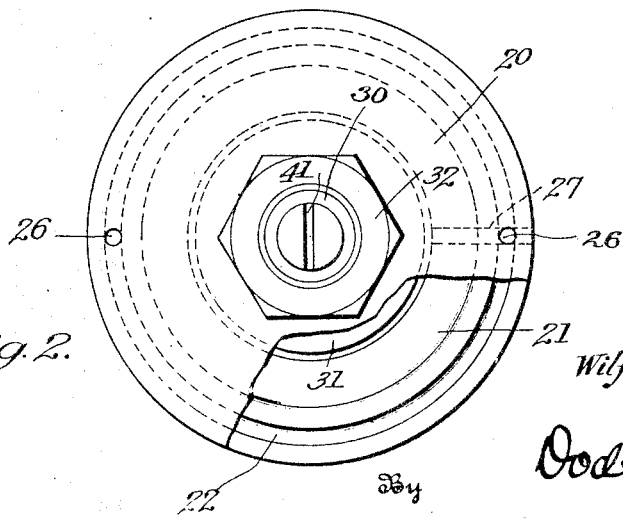

Fig. 2 is a plan view of the diaphragm assembly with the upper diaphragm partly broken away to show the internal construction.

The casing of the check valve consists of a body 6 and a cap plug 7 threaded at 8 into a projecting annular flange 9 formed on the body. The body 6 is formed with an oil pressure chamber 10 and the cap 7 is formed with a steam pressure chamber 11 which terminate, respectively, in shoulders 12 and 13 formed on the body and cap. The shoulder 12 is formed with an annular groove 14 and the shoulder 13 is formed with an annular groove 15 of equal diameters. A port 16 leads from the space 11 to the groove 15. A port 17 leads from the groove 14 to the oil discharge port 18.

Clamped between the shoulders 12 and 13 are the bottom diaphragm 19, the top diaphragm 20, and an interposed spacing ring 21. This ring 21 has on its upper face an annular groove 22 opposed to the groove 15, and on its lower face an annular groove 23 opposed to the groove 14. The grooves 22 and 23 are connected by a through port 24 and the diaphragms 19 and 20 are provided with small holes 25 and 26 which respectively connect the groove 14 with the groove 23 and the groove 15 with the groove 22. Consequently a by-pass for steam is afforded, and this by-pass is open however the parts are assembled. In other words, alinement of the ports 16, 24 and 17 and of the holes 25 and 26, or any of these, is unnecessary, because if they are displaced from each other the grooves form connecting passages.

The space between the diaphragms 19 and 20 is vented to atmosphere by way of port 27 in the spacing ring 21 and port 28 in the flange 9. The clearance around the outer margin of the spacing ring 21 is sufficient to connect ports 27 and 28 whether these be alined or not. The diaphragms 19 and 20 carry a valve sustaining member 29 which is shouldered and formed with an upwardly extending threaded extension 30. The extension 30 passes through openings at the centers of diaphragms 19 and 20 and also through an annular spacing member 31 which is interposed between the middle portions of these diaphragms. A nut 32 threaded on the stem 30 locks the diaphragms and the spacing member together and seals them against the shoulder on the valve sustaining member 29.

As is clearly shown in Fig. 1 the spacing member 21 is beveled alike on its upper and lower faces and affords clearance for the movements of the diaphragms, but the spacing ring 31 is flat on its upper face and is given a beveled or conical configuration on its lower face to the end that the area of engagement of the spacing ring 31 with the upper diaphragm shall be materially larger than the area of engagement of this ring with the lower diaphragm 19.

The effect of this formation of the spacing member 31 is to cause the upper diaphragm 20 to exert a materially greater resistance to the upward movement of the diaphragm assembly than both diaphragms offer to the downward movement thereof.
In this way a differential resistance is imparted to the diaphragm structure which gives the valve a bias in favor of downward or valve closing movement. To all intents and purposes the structure is a differential diaphragm and since both diaphragms are the same size the device is easier to construct and assemble than it would be if use were made of a conventional differential diaphragm mechanism requiring two different sizes of diaphragms.

The differential effect is quite pronounced, it being feasible to balance an oil pressure of 250 pounds acting upward on the diaphragm 19 with a pressure of 200 pounds per square inch acting downward on the diaphragm 20.

The member 29 is provided with a tubular externally threaded extension 33 at its lower end, and axially alined with the bore of this extension is a threaded opening which extends the entire length of the member 29. Mounted within the extension 33 is a pin valve 34 which has a head 35 and which is loosely guided by an annular cup nut 36 threaded on the extension 33. A coil spring 37 surrounds the pin valve 34 and is seated at its lower end against the cup nut 36 and at its upper end against the projecting portion of the head 35.
The spring 37 retains the pin valve 34 in its upper or retracted position. This pin is rendered adjustable by a threaded plug 38 which is screwed into the threaded bore of the member 29 and locked in adjusted position by a screw 40 also threaded into said bore. Leakage through the bore of the member 29 is prevented by a sealing screw 41 screwed into the upper end of the bore and having a conical sealing surface which insures a tight joint.

Valve 34 coacts with a seat of a valve bushing 42 which is threaded into the body 6 and which controls a passage leading to the oil discharge port 18. The port 18 terminates at the end of a nipple portion 43 integral with the body 6 and provided externally with pipe threads 44, by means of which the device is screwed into a port leading to a steam passage associated with a steam motor. This passage may be a port within the motor structure or it may be the main inlet port leading to the distributing mechanism. More generally stated, it may be any port under steam pressure to which it is desired to deliver lubricating oil.

Oil is received from a force feed lubricator, (for example, one of the type shown in the patent to W. G. Coles, No. 1,522,673, dated January 13, 1925) by way of a passage 45 which is connected by means of a union 46 with a delivery oil pipe 47 of the lubricator. A passage 48 formed with pipe threads leads directly to the chamber 11 and to it is connected a pipe which conducts the loading pressure fluid to the chamber 11.
This is ordinarily live steam pressure and is preferably steam pressure derived directly from the boiler and hence not under the control of the main engine throttle.

The reason for preferring this arrangement, is that in locomotive engines on which lubricating devices of this sort are most commonly used, it is desirable to deliver steam through the passages 16 and 17 to the oil passage 18 while the engine is drifting with the throttle closed, the purpose being to atomize the oil at a time when no steam is flowing to the engine through the main steam line. In order to insure accurate functioning of the terminal check valve, it is important that the valve 34 shall seat properly when the diaphragms 19 and 20 are not loaded. This result may be effected before the terminal check valve is mounted, or after it has been mounted, provided the steam pipe is disconnected at 48. It then becomes possible to remove the screws 41 and 40, and after adjusting the screw 38, to replace the screws 40 and 41, after which pipe connection at 48 can be made.
An important advantage is that this adjustment is made while the terminal check valve is assembled and without disturbing the diaphragm mounting.

Obviously, various changes in the specific construction might be made, and I do not limit myself to the specific embodiment illustrated.

What is claimed is,—

1. In a terminal check valve, the combination of a body; a diaphragm mounted in said body and defining therein an oil pressure chamber; a valve seat controlling a discharge passage leading from the oil pressure chamber; a pin valve loosely mounted on said diaphragm and positioned to coact with said valve seat, the parts being so arranged that oil pressure tends to move the diaphragm in a valve opening direction; means for loading the diaphragm in a valve closing direction; and an adjustable thrust member for determining the relation between the diaphragm and pin valve.

2. In a terminal check valve, the combination of a body; a diaphragm structure dividing said body into a fluid pressure chamber and an oil pressure chamber; means for conducting pressure fluid to the fluid pressure chamber; means for conducting oil under pressure to the oil pressure chamber;
a valve seat controlling a discharge passage leading from the oil pressure chamber; a valve loosely mounted on the diaphragm structure and positioned to coact with said valve seat; and an adjustable thrust member for adjusting the relation between said diaphragm structure and said valve.

3. In a terminal check valve, the combination of a body; a diaphragm structure dividing said body into a fluid pressure chamber and an oil pressure chamber; means for conducting pressure fluid to the fluid pressure chamber; means for conducting oil under pressure to the oil pressure chamber; a valve seat controlling a discharge passage leading from the oil pressure chamber; a valve loosely mounted on the diaphragm structure and positioned to coact with said valve seat; a thrust screw adjustably mounted in said diaphragm structure and entering into thrust relation with said valve to move the same in closing direction; and means for locking said screw in its adjusted positions.

4. In a terminal check valve, the combination of a body; a diaphragm structure dividing said body into a fluid pressure chamber and an oil pressure chamber; means for conducting pressure fluid to the fluid pressure chamber; means for conducting oil under pressure to the oil pressure chamber; a valve seat controlling a discharge passage leading from the oil pressure chamber; a valve loosely mounted on the diaphragm structure and positioned to coact with said valve seat; a screw adjustably mounted in a threaded opening extending through said diaphragm structure and entering into thrust relation with said valve to move the same in valve closing direction; a locking screw also mounted in said threaded opening for locking the first named screw in position; and a removable sealing screw threaded in the same opening for preventing leakage past said screws.

5. In a terminal check valve, the combination of a body; a diaphragm structure mounted in said body and dividing it into a fluid pressure chamber and an oil pressure chamber, said diaphragm structure including at least one diaphragm and a central valve-carrying element movable by the flexure of the diaphragm and having a threaded aperture therethrough; a pressure fluid supply port alined with the center of the diaphragm and leading to said fluid pressure chamber; means for conducting oil under pressure to the oil pressure chamber; a valve seat controlling a discharge passage leading from the oil pressure chamber; a valve arranged to coact with said valve seat and loosely supported on the diaphragm structure; a thrust screw mounted in the central threaded aperture of the diaphragm structure and in thrust relation with said valve; and means operable through the pressure fluid supply port for giving access to said screw, and for locking the same in adjustment and for sealing the same against fluid leakage.

6. In a terminal check valve, the combination of a body; a diaphragm structure mounted in said body and dividing it into a fluid pressure chamber and an oil pressure chamber, said diaphragm structure including at least one diaphragm and a central valve-carrying element movable by the flexure of the diaphragm and having a threaded aperture therethrough, there being means to afford an opening alined with the center of the diaphragm and through the wall of said fluid pressure chamber to afford access to said threaded aperture; means for conducting pressure fluid to the fluid pressure chamber; means for conducting oil under pressure to the oil pressure chamber; a valve seat controlling a discharge passage leading from the oil pressure chamber; a valve arranged to coact with said valve seat and loosely supported on the diaphragm structure; a thrust screw mounted in the central threaded aperture of the diaphragm structure and in thrust relation with said valve; a locking screw mounted in the same aperture and serving to lock the first named screw in its adjusted position; and a sealing screw also mounted in said aperture and adapted to prevent leakage of pressure fluid therethrough.

7. In a terminal check valve, the combination of a sectional body; a flexible diaphragm element clamped between the parts of said body and dividing the interior of the casing into a fluid pressure chamber and an oil pressure chamber; a valve seat controlling a discharge passage leading from the oil pressure chamber; a valve operatively connected with said diaphragm element and arranged to close against said seat when the total effective fluid pressure on the diaphragm element exceeds the total effective oil pressure thereon; and means for discharging fluid from the fluid pressure chamber to the discharge passage including ports and grooves communicating therewith in the diaphragm clamping portions of the body structure, in combination with connecting ports through the clamped portion of the diaphragm element.

8. In a terminal check valve, the combination of a sectional body; a diaphragm structure clamped between the parts of said body and including two diaphragms with a fixed peripheral spacing means and with a central spacing means movable with the diaphragms and serving to cause them to move in unison, said diaphragm structure dividing the interior of the casing into a fluid pressure chamber and an oil pressure chamber; a valve seat controlling a discharge passage leading from the oil pressure chamber; a valve operatively connected with said diaphragm structure and arranged to close against said seat when the total effective fluid pressure on the diaphragm structure exceeds the total effective oil pressure thereon; and means for discharging fluid from the fluid pressure chamber to the discharge passage, including ports and grooves communicating therewith in the diaphragm clamping portions of the body structure and in the peripheral spacing element, in combination with connecting ports formed through the clamped portions of the diaphragms, and adapted to register with said grooves and connect the same in all assembled relations of the parts.

In testimony whereof I have signed my name to this specification.

WILFRED G. COLES.